United States Patent [19]

Marcinkiewicz

[11] 4,319,494
[45] * Mar. 16, 1982

[54] RETORQUE MEASURING APPARATUS

[75] Inventor: Eugene J. Marcinkiewicz, Plymouth, Mich.

[73] Assignee: GSE, Inc., Farmington Hills, Mich.

[*] Notice: The portion of the term of this patent subsequent to Jan. 13, 1998, has been disclaimed.

[21] Appl. No.: 217,481

[22] Filed: Dec. 17, 1980

Related U.S. Application Data

[63] Continuation-in-part of Ser. No. 20,610, Mar. 15, 1979, Pat. No. 4,244,213.

[51] Int. Cl.³ .................... B25B 23/142; G01L 5/24
[52] U.S. Cl. .................................. 73/862.23; 73/761
[58] Field of Search ............... 73/761, 770, 139, 847, 73/848, 862.23

[56] References Cited

U.S. PATENT DOCUMENTS

| 2,888,825 | 6/1959 | Krafft | 73/139 |
| 3,995,477 | 12/1976 | Almond | 73/139 |
| 4,074,772 | 2/1978 | Jonsson | 73/770 |
| 4,244,213 | 1/1981 | Marcinkiewicz | 73/139 |

FOREIGN PATENT DOCUMENTS

680311 10/1952 United Kingdom ............... 73/770

Primary Examiner—Charles A. Ruehl
Attorney, Agent, or Firm—Krass, Young & Schivley

[57] ABSTRACT

Apparatus for measuring the amount of previously applied torque to a fastener. A transducer is utilized to sense the amount of a subsequently applied torque to the fastener and provides an output signal representative of the applied torque. The torque is applied until further motion or breakaway of the fastener is obtained. Typically, the signal from the transducer increases until breakaway of the fastener is obtained and then the signal decreases momentarily to a valley before it again increases with further applied torque. In those instances where the particular fastener does not exhibit a well-defined valley torque signal, provision is made for detecting the value of the transducer torque signal upon breakaway. Preferably, circuitry is provided for artificially creating the valley when there is a change of slope in the torque signal above a given threshold level. This artificially created valley is detected by a negative peak detector whose output is generally closely associated with the amount of torque originally applied to the fastener.

5 Claims, 16 Drawing Figures

RETORQUE MEASURING APPARATUS

CROSS REFERENCE TO RELATED APPLICATIONS

This application is a continuation-in-part application of U.S. Ser. No. 20,610, filed Mar. 15, 1979, entitled "Retorque Measuring Apparatus", now U.S. Pat. No. 4,244,213.

BACKGROUND OF THE INVENTION

This invention relates to apparatus for measuring torque. More particularly, it involves apparatus for sensing the amount of previously applied torque to a fastener.

In a variety of manufacturing applications, it is imperative that the correct amount of torque be applied to a fastener. For example, in automotive applications, it is necessary to make sure that bolts have been tightened within a certain prescribed range of torque in order to properly fasten two parts together. It has been common procedure for a member of the quality control department to use a hand torque wrench to approximate the prior torque level by viewing the movement of the torque indicator just prior to the "give" or breakaway of the fastener. Later improvements of such a test included the use of a wrench which would maintain the position of the indicator at the maximum torque experienced.

Unfortunately, these prior art methods of sensing the applied torque were not very precise and not capable of being accurately reproduced from operator to operator. Even under ideal conditions the torque sensed was the "breakaway" torque which caused further relative movement of the fastener and not the torque delivered to the fastener in the first instance. Under true operating conditions even this breakaway torque could not be accurately sensed because the operator was not capable of instantaneously stopping the level of applied torque as soon as he noticed the fastener motion.

The above-identified parent application provides apparatus for detecting a negative valley in the torque signal which occurs in most fasteners after "breakaway".

A negative peak detector is energized by a switching network upon detection of a negatively sloped signal from the transducer. A display device is utilized to provide a visual indication of the output of the negative peak detector thereby providing a measurement which is closely associated with the amount of torque originally applied to the fastener.

Unfortunately, in some instances the torque signal does not provide a well defined negative valley. The reason for this phenomena is not completely understood but it is believed to be due to the fact that some fasteners have polished threads or are lubricated to such a degree that the torque signal does not always possess a negative slope after breakaway. Operator error in improperly applying the torque to the fastener may also be a cause.

The present invention is directed to solving one or more of these problems.

SUMMARY OF THE INVENTION

The present invention is broadly directed to a method and apparatus of detecting the amount of previously applied torque to a fastener. This is accomplished in general by detecting a change of slope in the torque signal above a given threshold level. The torque signal is supplied by a transducer providing an output signal representative of a subsequently applied torque to the fastener which is applied until the motion of the fastener is obtained. A negative peak detector is advantageously used to detect the least positive value of a segment of the torque signal occuring after breakaway. In those instances in which the torque signal does not exhibit a well defined negative valley, means are provided for artificially creating this negative torque signal for energizing the negative peak detector. Preferably, a negative ramp generator is utilized whose output is summed with the transducer signal such that the resultant output has a recognizable negative slope. This output signal is used to trigger the energization of the negative peak detector whose output provides a measurement which is closely associated with the amount of torque originally applied to the fastener.

BRIEF DESCRIPTION OF THE DRAWINGS

These and other advantages of the present invention will become more apparent upon reading the following specification and by reference to the drawings in which:

FIG. 2 (A-H) is a series of waveforms showing signals normally encountered in the circuitry of the present invention;

FIGS. 4 (A-C) are a detailed schematic of the components shown in block diagram form in FIG. 3;

DESCRIPTION OF THE PREFERRED EMBODIMENTS

Figures 1, 2:
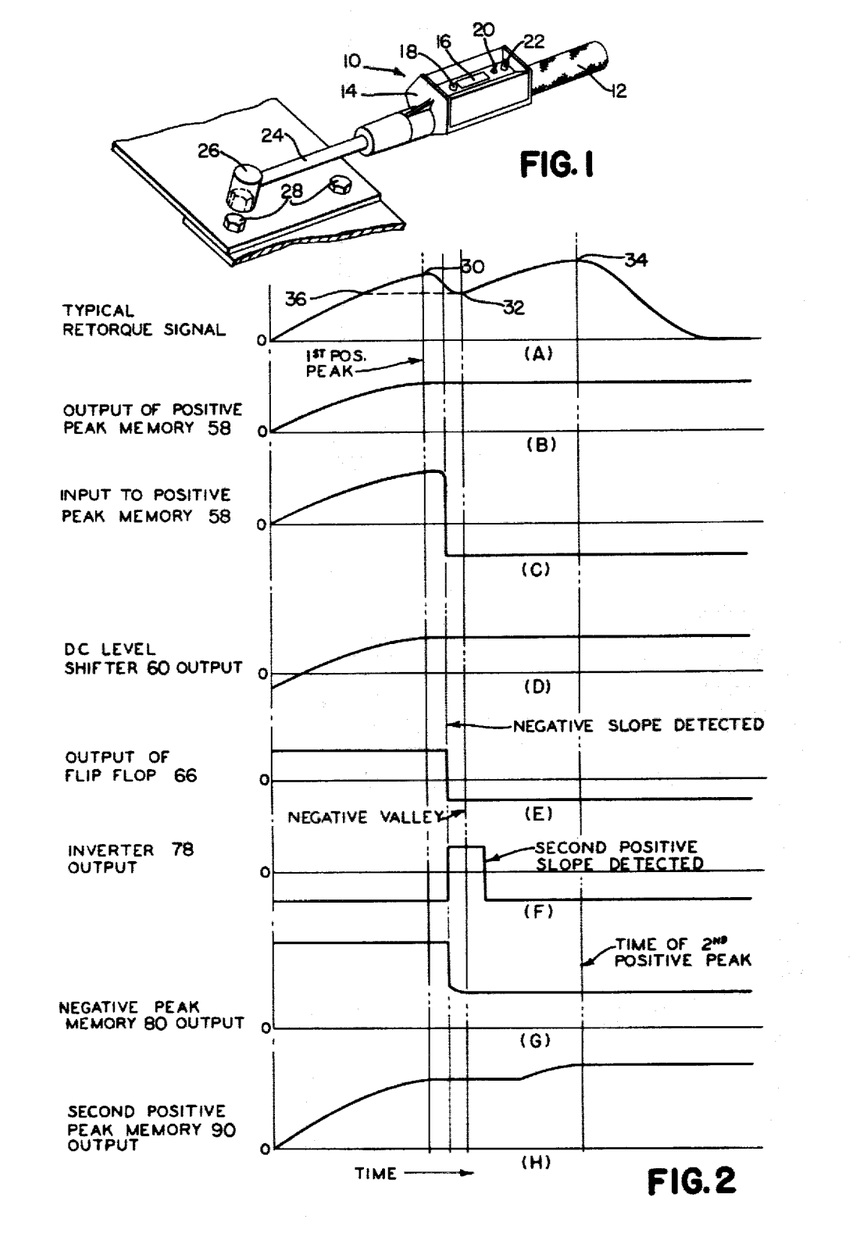
FIG. 1 is a perspective view showing the apparatus of the present invention in typical use.

FIG. 1 illustrates one example of a torque wrench testing apparatus which may incorporate the concepts of the present invention. Torque wrench 10 includes handle 12 on which housing 14 is mounted on intermediate portions thereof. Housing 14 includes an LED display 16 which will be more fully described later in this description. Housing 14 includes an indicator lamp 18, a multiposition display selection switch 20, and a reset control switch 22. A shaft 24 attached to an opposite end of handle 12 includes a cylindrical head 26 at its free end. Head 26 includes suitable strain gages or other transducers therein for sensing the amount of torque applied by wrench 10. A more detailed description of a suitable transducer and torque wrench may be had by reference to U.S. Pat. No. 4,125,016 to Lehoczky et al issued Nov. 14, 1978, and assigned to the assignee of the present invention.

In a typical application of this apparatus, it is used to test the amount of previously applied torque to a fastener such as bolts 28. Head 26 of torque wrench 10 includes a suitable socket on its lower end for receiving the head of bolt 28. The wrench 10 is then rotated by the operator in the fastening direction until further rotational movement of bolt 28 is noted. This is commonly referred to in the industry as the "breakaway" of the fastener under test. FIG. 2A shows a typical torque level signal that may be encountered in this retorquing operation. The torque level increases with increasingly applied force by the operator until point 30 at which time the fastener begins further rotational movement. This point shall be referred to as the breakaway torque level. Immediately after the breakaway torque, the torque level sensed decreases to a minimum level 32. This point shall be referred to as the valley torque. It is not completely understood why the torque signal will decrease even though the operator is still applying force to the wrench 10. However, it is believed that this momentary decrease is due to the frictional forces being overcome between the bearing surfaces of the fastener and the fastened part. After a short period of time, the torque signal again increases to a maximum level 34 until the operator ceases to apply any more force to wrench 10. The maximum level 34 will, of course, depend upon how soon the operator ceases applying further torque after noticing the motion of the fastener.

Accordingly, there are three torque levels of interest; namely, the breakaway torque 30, the valley torque 32, and the maximum torque 34. It is important to realize that the valley torque level 32 has been discovered to be a more accurate indication of the originally applied torque to the fastener. This level is shown in FIG. 2A as point 36. Thus, it can be readily appreciated that previous methods of detecting either torque levels 30 or 34 did not provide an accurate indication of the previously applied torque to the fastener. Instead, all that can be ascertained from such a measurement is that at least a certain prescribed force has been applied, but even this was hard to consistently verify due to the inherent operator error factor. In contrast, the apparatus of the present invention provides a capability of sensing all three torque levels.

Figure 3:
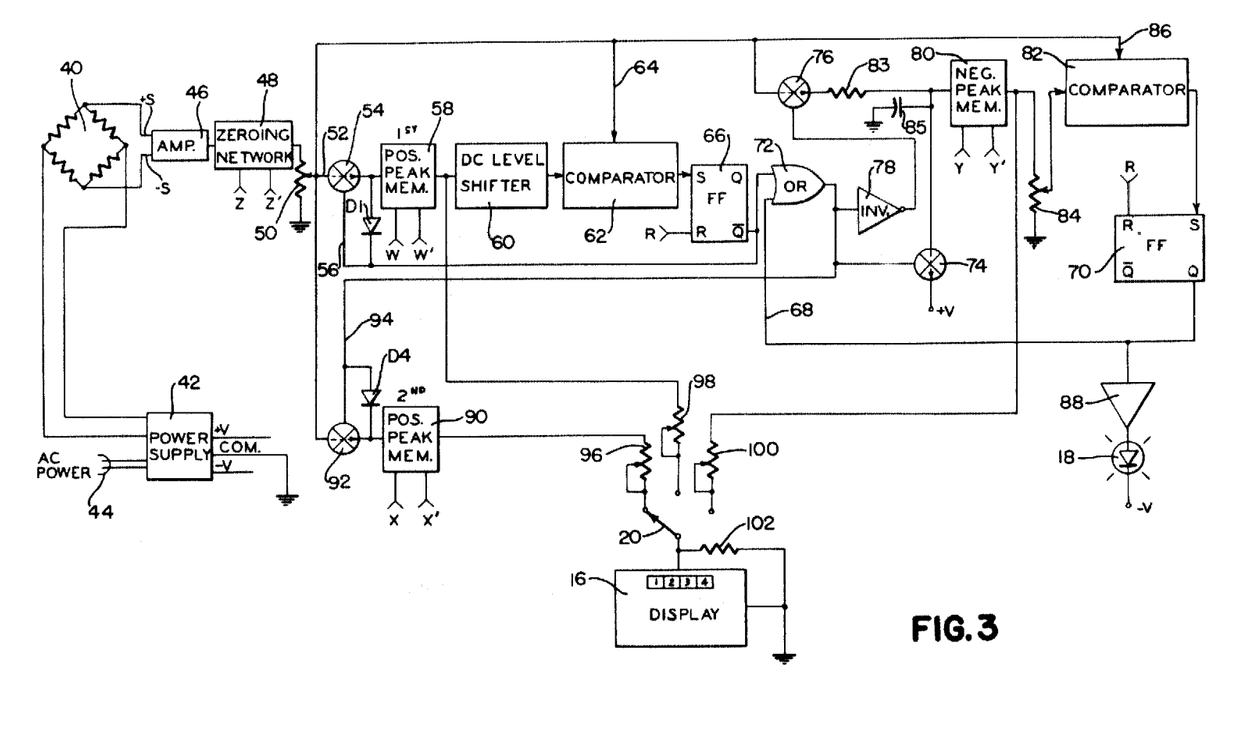
FIG. 3 is a block diagram of the electrical circuitry of the present invention.

FIG. 3 shows a functional block diagram of the circuitry of the present invention. A strain gage torque transducer 40 is powered by a regulated power supply 42 which supplies the necessary voltage levels to other portions of the circuitry as well. Plug 44 introduces on line power to the power supply 42. Transducer 40 can be a variety of suitable transducers for sensing the amount of applied torque. In this embodiment, strain gages in torque wrench head 26 are connected into a bridge network which provides a differential signal to amplifier 46 representative of the applied torque.

A zeroing network 48 is provided to adjust the output of amplifier 46 to a zero level when no torque is being applied by wrench 10. Zeroing network 48 may similarly take a multiplicity of forms such as a manually zeroing potentiometer, semi-automatic zeroing by the pushing of a button switch, or even via a timing circuit based upon prior conditions when the apparatus is used in an automated machine environment. A properly amplified and zeroed signal from transducer 40 is entered into a scaling potentiometer 50.

The conditioned transducer output signal is then split into five paths, all of which are coupled to node 52. The first path is into a semiconductor switching device 54 controlled by signals on control line 56. With a positive voltage or high signal on control line 56, device 54 conducts and passes signals from node 52 to an input terminal of a positive peak memory 58. The purpose of peak memory 58 is to store the breakaway torque level 30 shown in FIG. 2A. A simple peak detection device could not differentiate between the breakaway torque signal 30 and the maximum torque level 34. Accordingly, provision is made for detecting a negative going torque signal and turning off or de-energizing switch 54.

A representative example of an input signal to memory 58 is shown in FIG. 2C and its output is shown in FIG. 2B.

The output of memory 58 is coupled to a DC level shifter 60. The output of DC level shifter 60 is coupled to a comparator 62 which compares the virgin torque signal on line 64 coupled to node 52 with the adjusted signal from shifter 60. As shown in FIG. 2D, the shifter 60 provides a negative offset with respect to the peak memory 58 output signal. Without the DC level shifting circuit 60, both inputs to comparator 62 would be the same, thereby resulting in an indeterminate condition for comparator 62. While this latter problem could be solved by reducing (attenuating) one of the signals to the comparator 62 via a simple voltage dividing network, such a solution may make the comparator sensitive to the level at which the slope reversal of the transducer signal takes place. On the other hand, the DC level shifter 60 provides a constant shift of the transducer signal to establish the level of offset required to circumvent inherent noise excursions of the signal and yet allow sensing of slope reversal at the earliest possible moment. By comparing FIG. 2A to 2D, it can be seen that as long as the torque signal is increasing, the signal inputs to comparator 62 will be unequal. However, when the torque signal begins to decrease, the inputs to comparator 62 will become equal at the certain point determined by the level of offset. When coincidence is detected by comparator 62, it provides an output signal to the set input of an RS flip-flop 66 indicating detection of a negatively sloped transducer signal. At the beginning of the retorquing process, flip-flop 66 is reset via switch 22 thereby resulting in a positive voltage level on control line 56 for coupling transducer signals to peak memory 58. However, when flip-flop 66 is set, control line 56 goes low, thus opening switch 54 and preventing any subsequent storage of positive torque in peak memory 58. Accordingly, the output of positive peak memory 58 can be coupled to display device 16 via switch 20 to display the breakaway torque level.

Focusing attention now on the detection of the valley torque 32, control line 68 has been in a low state due to initial reset of flip-flop 70 during the beginning of the retorquing process in the same manner as flip-flop 66. After the $\overline{Q}$ output of flip-flop 66 goes low upon detection of a negative going transducer output signal, the output of OR gate 72 goes low. The low output signal from OR gate 72 is coupled to semiconductor switch 74 and to semiconductor switch 76 through inverter 78. Inverter 78 produces a high signal for switch 76 which turns it on and allows the transducer signal to enter the negative peak memory circuit 80 upon detection of a negatively sloped transducer signal. FIG. 2F shows the output signal of inverter 78. Conversely, switch 74 assumes a non-conductive state. The purpose of switch 74 is to initially set the input to negative peak memory 80 at a preselected positive voltage level during the reset of the circuit at the beginning of the test. When terminals Y and Y' are shorted at reset, the input to negative peak detector 80 will be brought to a voltage level of about +V through switch 74 which is conducting at that time. Resistor 83 and capacitor 85 filter some of the switching transients when switch 76 is first turned on. FIG. 2G shows the output of negative peak memory 80. The value of +V is not particularly important as long as it is higher than the normally expected negative peak level. As should now be clear to one skilled in the art, the less positive transducer signal values cause the previously stored value to be successively reduced such that the final output of detector 80 is the least positive or most negative value detected when switch 76 is turned on. The minimum level of the torque signal or valley torque is thus stored in the negative peak memory 80 which, in turn, can be displayed on display 16 by moving switch 20 to the appropriate contact.

The output of negative peak memory 80 is coupled to one input of a comparator 82 through potentiometer 84. It should be noted that negatively sloped signal values are stored in the memory 80 which will continue to store such signals until comparator 82 senses a positive slope on line 86 which is coupled to the virgin transducer output. Potentiometer 84 establishes the necessary offset similar to the DC level shifter 60. A constant offset which would be provided by such a DC level shifter would be advantageous, but it has been found to be an unnecessary expense and satisfactory results are obtainable by the use of a simple potentiometer. In this embodiment, the gain of memory 80 is adjusted so that its output is more positive with respect to the transducer signal on line 86 during its negatively sloping portion. When the transducer torque signal on line 86 begins to again increase, the signal on lines 86 and 84 become substantially equal thereby providing an output signal from comparator 82 which sets flip-flop 70. The high output signal on the Q terminal of flip-flop 70 activates indicator lamp 18 via amplifier 88 to provide a visual indication that the valley torque has been detected and that the operator should cease applying further torque. The high signal from flip-flop 70 is also coupled to the input of OR gate 72. Thus, the output of OR gate 72 goes high, thereby reversing the conductivity states of switches 74 and 76.

Of course, it is practically impossible for the operator to immediately stop supplying any further torque to wrench 10 when valley torque lamp 18 is activated. For whatever reasons, an excessive amount of torque may be ultimately applied to the fastener. According to another feature of this invention, the maximum positive force applied to the fastener throughout the entire span of operation is also detected and displayed. The transducer signal from node 52 is coupled to a second positive peak memory 90 which is substantially identical to positive peak memory 58. A semiconductor switch 92 is conducting during the entire testing operation except for the time at which the valley torque is being detected. The output of OR gate 72 is coupled to the control line 94 of switch 92 such that a low signal on line 94 will cause switch 92 to block the entry of the transducer signal to memory 90. It can be remembered that the only time that OR gate 72 has a low output signal is during the time of the negative slope of the transducer signal. Accordingly, memory 90 detects and stores the signal such as signal 34 which is representative of the maximum applied torque during the entire span of operation. The output of the second positive peak memory 90 is shown in FIG. 2H. The output of memory 90 is coupled to display 16 via switch 20 where a visual indication of its output can be displayed by the appropriate setting of switch 20.

Accordingly, it can be seen that the breakaway torque 30, the valley torque 32, and maximum torque 34 can each be selectively displayed. Trim potentiometers 96, 98, 100, and resistor 102 are used for scaling the signals to make them compatible with display 16 in a manner well-known in the art.

Figure 4A:
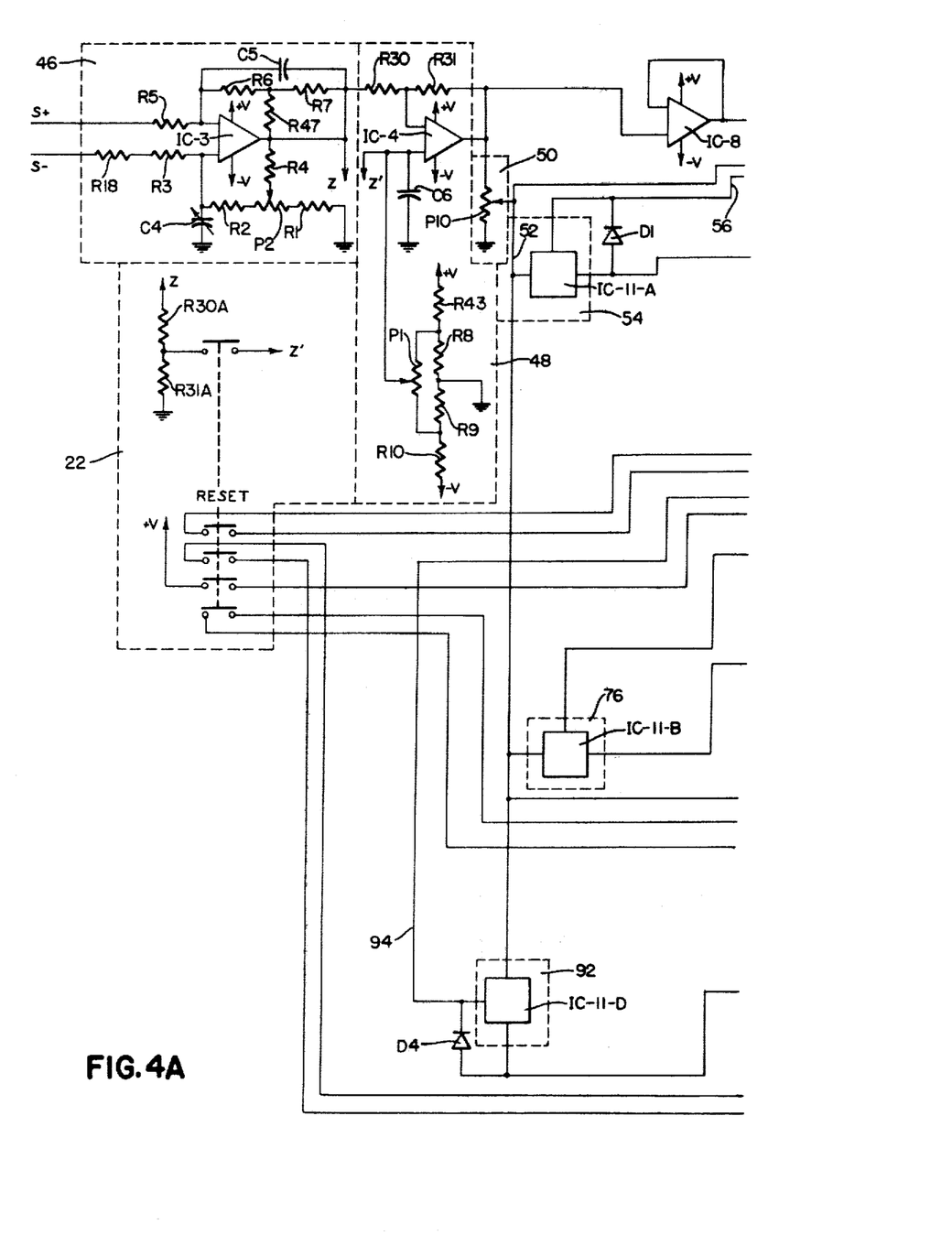
Figure 4B:
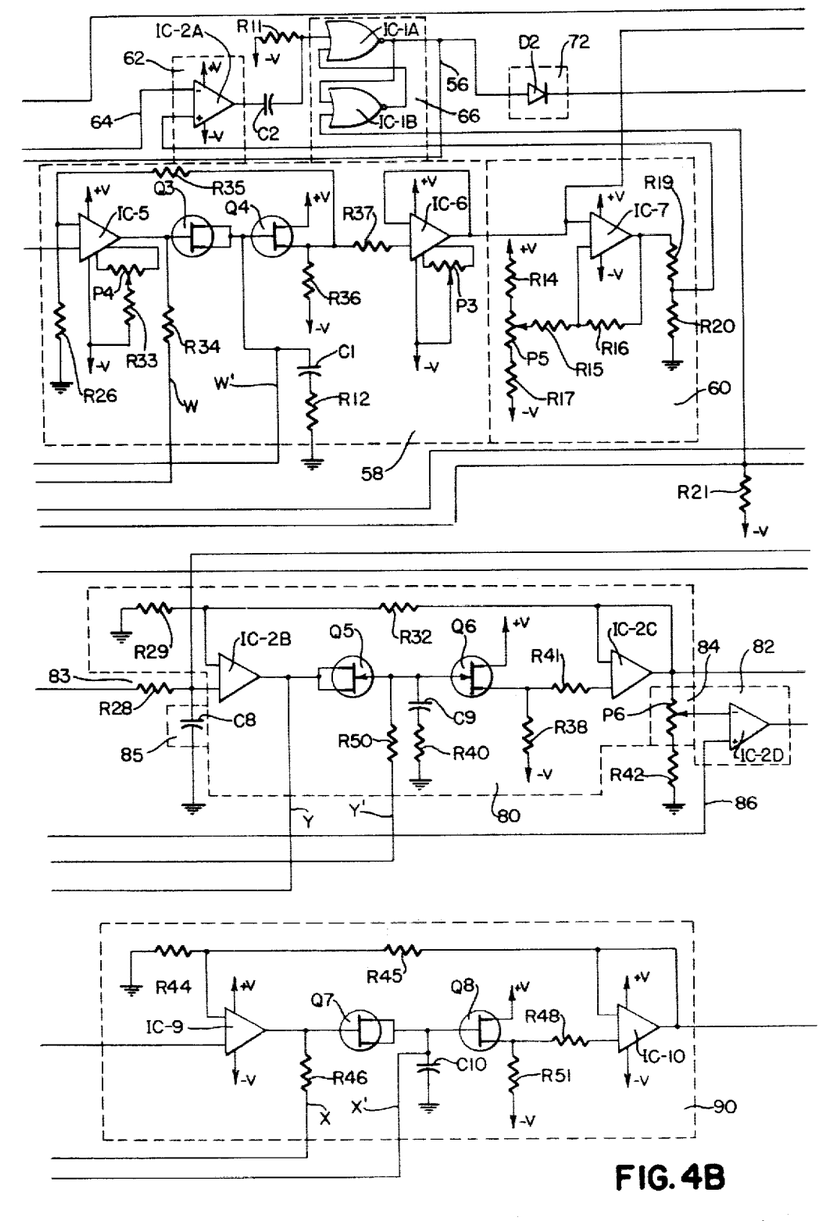
Figure 4C:
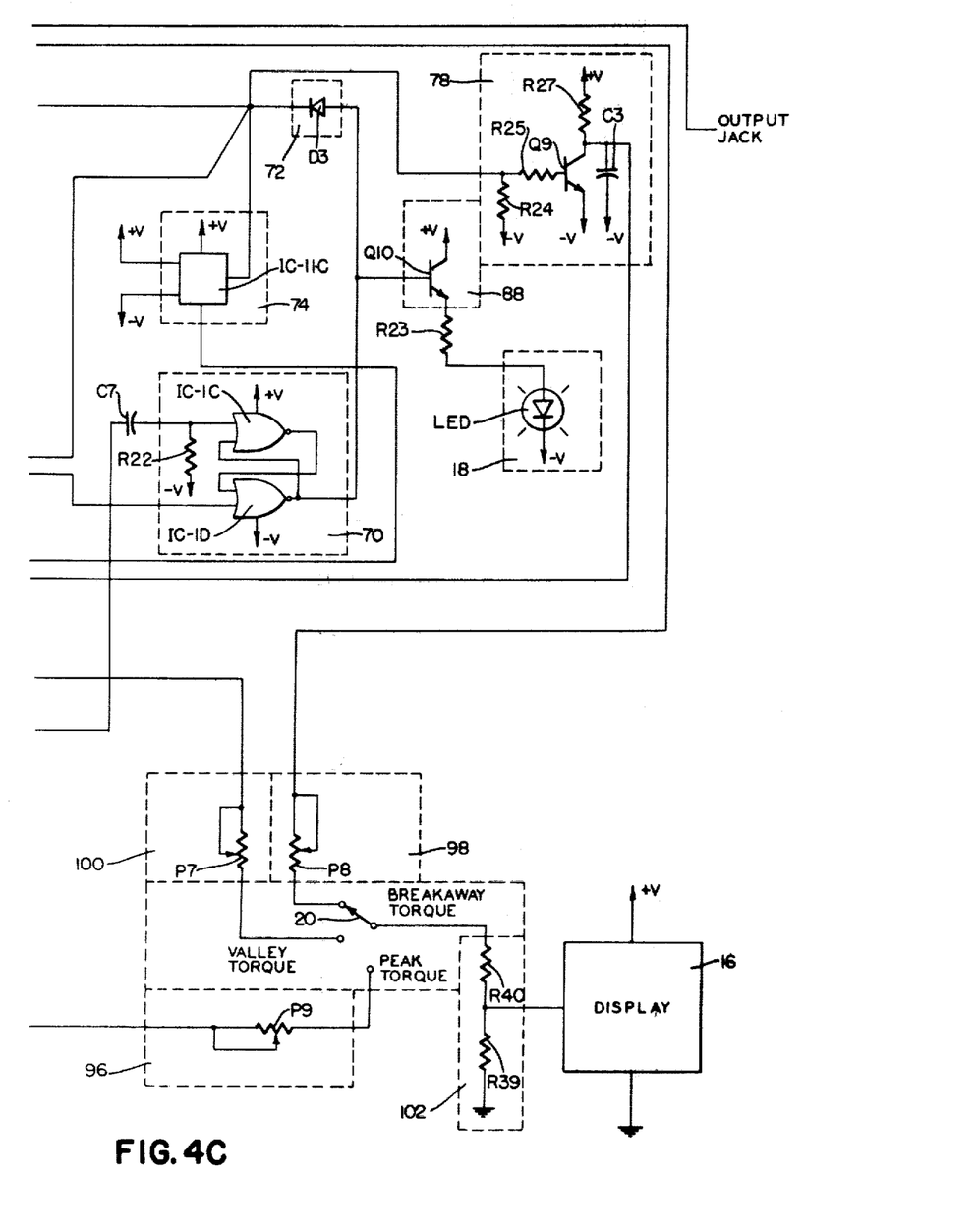

FIG. 4 shows the details of the functional blocks just described in connection with FIG. 3. The components making up these functional blocks are circumscribed by dotted lines in FIG. 4. Accordingly, it is believed that a detailed description describing the connection of each component would be superfluous and unnecessary for a person skilled in the art to construct the circuit disclosed in detail in FIG. 4.

Briefly, amplifier 46 comprises operational amplifier IC3 and associated resistors to establish its gain as is well-known in the art. The output of amplifier 46 is coupled to zeroing network 48 in which the output thereof is regulated by potentiometer P1 to provide a zero output signal when the torque wrench is not being utilized. The first positive peak detector 58 employs a series of components IC5, Q3, Q4, and IC6 whose function is to store a charge on capacitor C1 representative of the first peak in the torque signal without letting the capacitor discharge on signals of lesser magnitude. The DC level shifter 60 employs integrated circuit IC7 whose output is regulated by the setting of potentiometer P5 to determine the level of offset. The non-inverting (+) input of comparator 62 is coupled to the output of level shifter 60 whereas the inverting (−) input is coupled to the transducer signal via node 52. When the signal from shifter 60 exceeds the transducer signal, it sets flip-flop 66 which is comprised of two cross-coupled NOR gates. OR gate 72 is comprised of two diodes D2 and D3 which control the activation of switches 74 and 76 comprised of integrated circuits IC-11C and IC-11B, respectively. Negative peak detector 80 employs a serial connection of components IC2B, transistors Q5 and Q6, and IC2C. When the device is first reset, capacitor C9 is charged to about +V. Upon receipt of less positive signals, the capacitor C9 discharges. Accordingly, capacitor C9 maintains the minimum negative output or valley torque signal 32. The inverting (−) input of comparator 82 is coupled to the output of negative peak memory 80 through potentiometer 84. The noninverting (+) input is coupled to the transducer signal via node 52. The gain of the components making up negative peak detector 80 is set to a high level so as to provide a positive offset with respect to the transducer signal. Accordingly, when the transducer signal becomes more positive with respect to the negative peak signal comparator 82 will provide an output which is coupled to flip-flop 70 comprised of two cross-coupled NOR gates. An output from flip-flop 70 causes diode D3 to conduct thereby turning switch 92 back on to allow the second positive peak memory 90 to sense the maximum positive peak throughout the entire span of operation. The second positive peak memory 90 is substantially identical to the first positive peak memory 58. The output of the first positive peak memory 58, the negative peak memory 80, and second positive peak memory 90 are coupled to a three-position switch 20 through trim potentiometers 98, 100 and 96, respectively.

Accordingly, to utilize this device, power is applied to the device and the reset switch 22 is pushed thereby resetting the flip-flops and generally initializing the peak detector circuit components. The display 16 is then zeroed to provide a zero output. This can be accomplished by a variety of means and it is envisioned that an automatic zeroing network can be employed in an automated system. The torque wrench is then inserted over the fastener to be tested and rotated until the valley detection indicating lamp 18 is lit. Then, by the appropriate positioning of switch 20, the breakaway torque 30, the valley torque 32, and the maximum applied torque 34 throughout the entire operation can be selectively displayed.

The circuit components are preferably mounted and interconnected by printed circuit boards which are suitably mounted in housing 14. However, alternative embodiments, including fabrication of integrated circuit chips incorporating large blocks of the circuitry are also possible. Similarly, various types of displays may be utilized and, along with the associated circuitry, need not necessarily be mounted as an integral fixure on the torque wrench 10.

Figure 5:
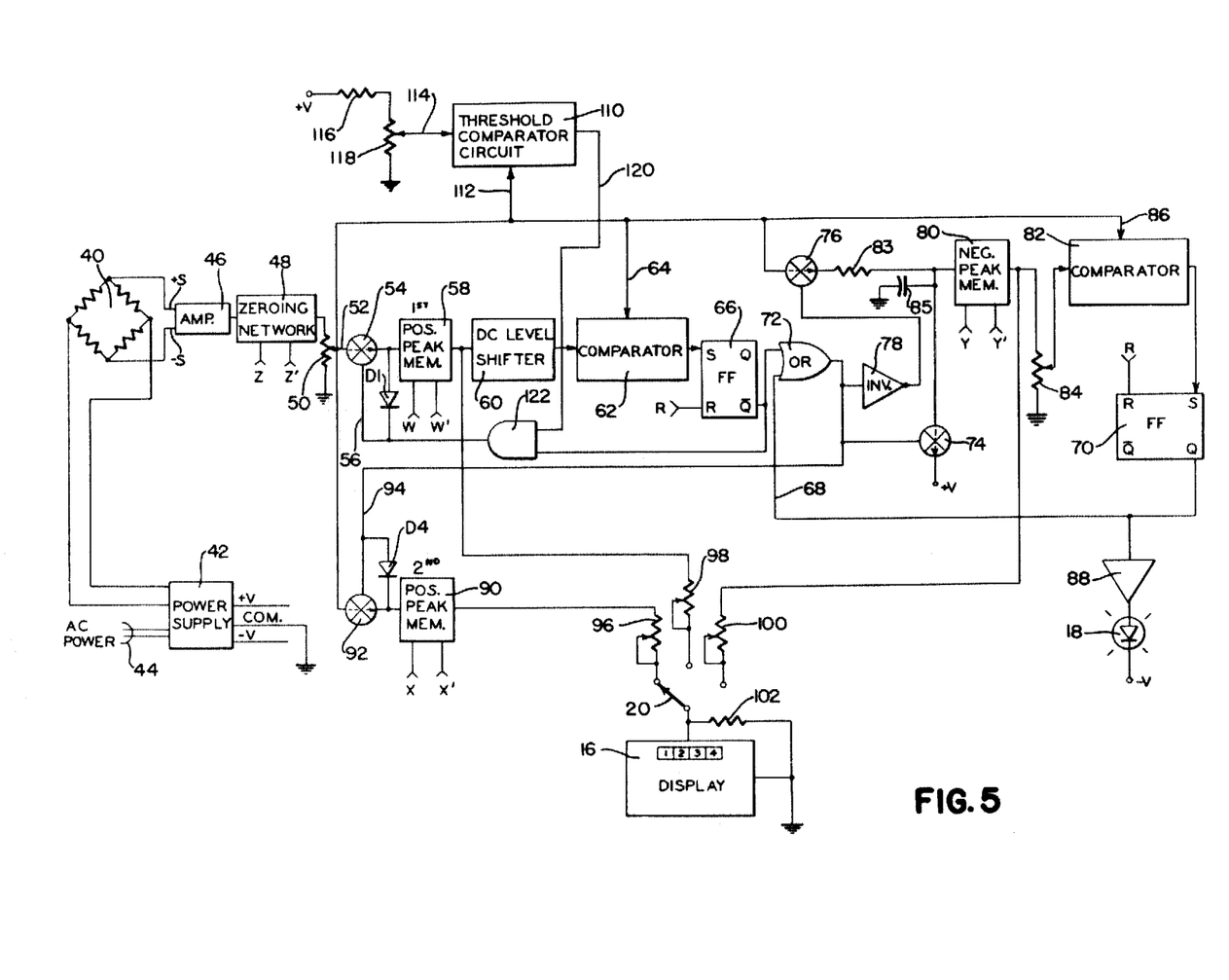
FIG. 5 is a block diagram along the lines of FIG. 3 which illustrates another feature of this invention.

FIG. 5 discloses another feature of this invention which automatically distinguishes those transducer output signals which are generated during the testing procedure and those which are not or merely preliminary to it. For example, during the insertion of torque wrench head 26 over bolt 28 the operator may accidentally be applying a small amount of torque to the fastener which may cause the test apparatus to believe this sensed torque was due to a bona fide test and thus provide an erroneous output.

To alleviate this possibility, thereshold comparator circuit 110 is provided which compares the transducer signal on line 112 with a preselected voltage level suppled on line 114 by a voltage divider network comprised of resistor 116 and potentiometer 118 coupled to a voltage supply +V. Potentiometer 118 is adjusted to provide a voltage level which is greater than the transducer output signal that may be generated under preliminary set up or other non-test conditions. By way of a simplified example, assume that the fastener under test is supposed to be torqued to 100 ft/lbs and that the transducer signal at this torque level would be about 10 volts. Thus, a transducer signal of at least 5 volts certainly would be encountered during the testing procedure since the operator must apply at least 100 ft/lbs of torque to reach the breakaway level. On the other hand, a transducer signal of less than 5 volts may be generated during initial set up. Accordingly, the potentiometer 118 may be adjusted to provide voltage level on line 114 of 5 volts. Comparator 110 will thus provide an output on line 120 only when the transducer signal on line 112 exceeds this level.

The output of comparator 110 on line 120 and the $\overline{Q}$ output of flip-flop 66 are coupled to two inputs of AND gate 122, the output of which is connected to control line 56. It will be remembered that the $\overline{Q}$ output is at a HIGH level when the circuit is initially reset. However, control line will be LOW, thus turning off switch 54, until a HIGH signal is received on line 120 from comparator 110. Accordingly, the entire remaining circuit operation previously described is thus disabled until the transducer signal exceeds the preset threshold level thereby preventing erroneous readings which may be caused by extraneous factors not related to the testing operation.

Figures 6, 7:
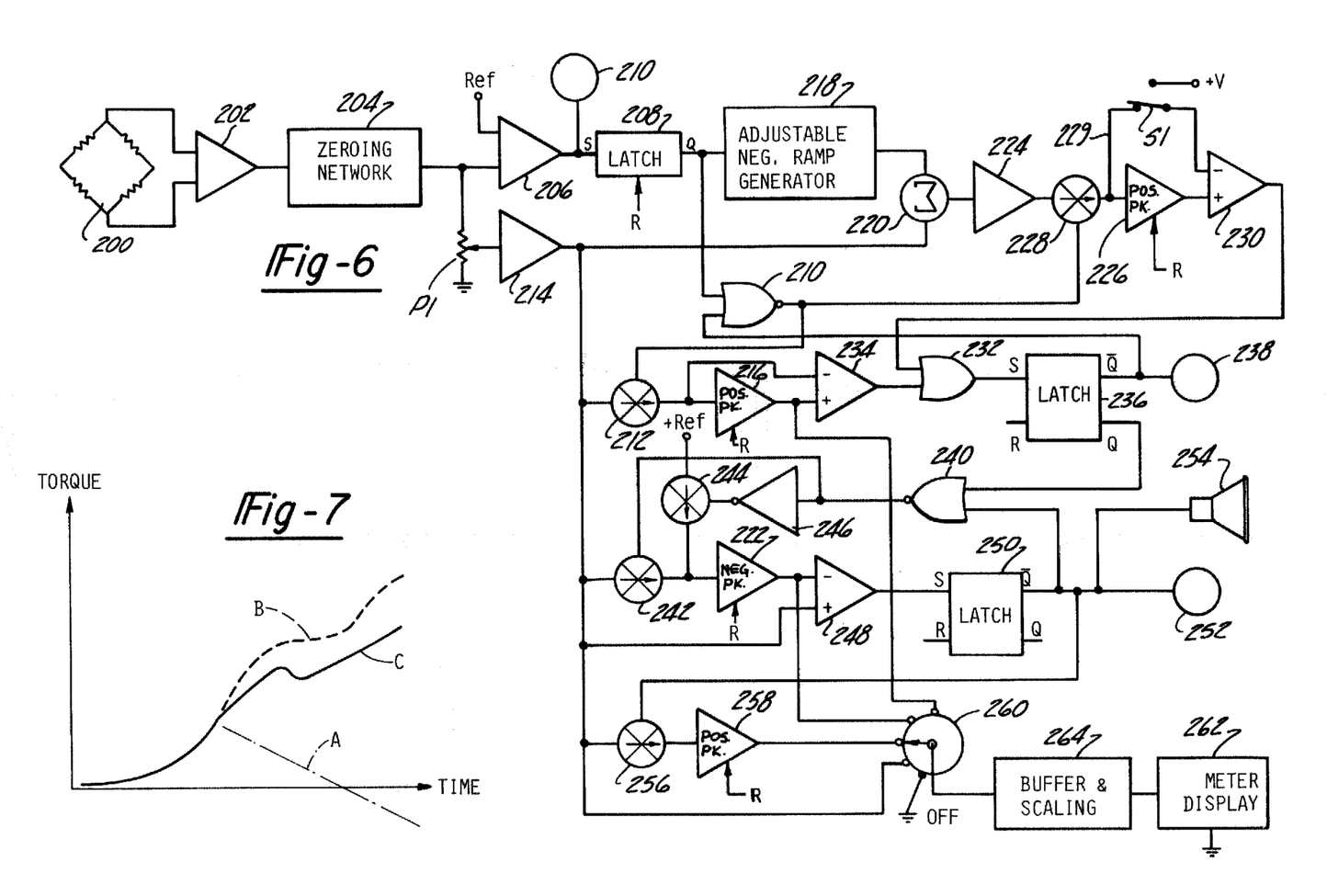
FIG. 6 is a block diagram of an improved form of the electrical circuitry of the present invention.
FIG. 7 is a waveform diagram illustrating the outputs of various components of the circuitry shown in FIG. 6.

Referring now to FIG. 6, a further improvement will now be discussed. The basic operation of the circuit shown in FIG. 6 is the same as that previously described in connection with the earlier embodiments. The primary difference is the addition of circuitry for artificially creating a negatively sloped torque signal in those fastener applications that do not exhibit a well defined valley.

In this embodiment, the torque signal from transducer 200 is amplified by amplifier 202 which subsequently passes through a zeroing network 204. Once the torque signal exceeds a predetermined reference level, a threshold comparator 206 provides an output signal which sets latch 208 and activates lamp 210. The resulting low Q output from latch 208 serves to activate NOR gate 210 which in turn operates to put semiconductor switch 212 into a conducting state. For purposes of the invention described in connection with this embodiment, the flip-flop or latch convention used is such that the Q output will go low when set with a positive voltage and the $\overline{Q}$ output will go high; conversely, the Q output will go high when reset with a positive voltage and the $\overline{Q}$ output will go low. The virgin torque signal after being buffered by buffer 214 is thus permitted to enter into the first positive peak and hold circuit generally designed by component 216.

The setting of latch 208 further energizes an adjustable negative ramp generator 218. The function of negative ramp generator 218 is to provide a negatively sloped linear output signal which, when summed with the virgin torque signal, will result in a signal which will exhibit a negative slope or valley after breakaway of the fastener.

The particular components making up the negative ramp generator is not critical. One skilled in the art can readily devise a variety of electronic components which will perform the desired function. One construction would be the use of an integrator which is controlled by an FET transistor in parallel with a capacitor in the feedback loop, with the inverting input of the op amp being fed with a positive reference voltage. When the transistor is shut off by the low output from latch 208, the output of the integrator goes negative at a linear rate. Reference to FIG. 7 will further clarify the purpose of the negative ramp generator 218. When the torque signal reaches the threshold level (Th) the negative ramp generator 218 provides a signal labeled A in FIG. 7. This signal A when summed at summing junction 220 with the virgin torque signal B results in a modified signal labeled C in FIG. 7 having a negative valley. This accomplishes two functions: (1) it provides a first peak at the breakaway point which can be detected by the first positive peak and hold circuit 216; and (2) it provides a negative sloped valley which is detected by the negative peak and hold circuit 222 as will be explained.

The output signal from summing junction 220 is fed through buffer 224 to a modified positive peak and hold circuit 226 through switch 228 which has been previously placed in its conducting state by NOR gate 210 when the threshold level has been exceeded. A parallel signal path 229 around circuit 226 is coupled to the inverting input of comparator 230 whereas the output of circuitry 226 is coupled to the noninverting input of comparator 230. Comparator 230 will trip to provide an output signal to energize OR gate 232 when the output of peak and hold circuit 226 becomes more positive than the signal content on path 229. This will happen when the artificially generated negatively sloped valley occurs.

A switch S1 may be used to inhibit the artificial creation of the valley. When the wiper of switch S1 is instead coupled to a positive voltage source (+v) the comparator 230 never trips. In such cases, the circuitry operates substantially as hereinbefore described.

OR gate 232 can thus be activated either by the output of comparator 230 or by the output of comparator 234. The activation of OR gate 232 will set latch 236.

The Q̄ output is sent back to the input of NOR gate 210 whose resulting logical zero output serves to place switches 212 and 228 into their nonconducting state. The controlled energization/deenergization of switch 212 defines a segment of the torque signal which is monitored by the first peak and hold circuit 216. Thus, the contents of the first positive peak and hold circuit 216 provides a measurement of the breakaway torque even though the virgin torque signal continues to increase. The Q̄ output of latch 236 is also coupled to lamp 238 to provide a visual indication that breakaway of the fastener has occured and has been detected by the system.

The Q output of latch 236 is coupled to an input of NOR gate 240. The resulting positive output signal from NOR gate 240 energizes analog switch 242 to provide the virgin torque signal to the input of negative peak and hold circuitry 222. Simultaneously, analog switch 224 is placed in a nonconducting state by way of the inverted signal provided by inverter 246. Negative peak and hold circuitry operates substantially identical to that previously discussed. Even in those instances where a true negative torque signal is not experienced, negative peak and hold circuitry 222 will store the least positive signal presented to it during the time that it is energized. Once the virgin torque signal increases beyond the stored amount in circuitry 222, comparator 248 is tripped causing latch 250 to be set. With reference to FIG. 7 this will occur when the value of the virgin torque signal begins to increase. In cases where the negative peak and hold circuitry 222 is energized by the artificially created signal, this will occur quite rapidly. However, the contents of the negative peak and hold circuit 222 will still provide a measurement of the previously applied torque to the fastener, although in cases where a well defined valley is not present, the output of circuitry 222 will be substantially the same as the breakaway torque stored in the first positive peak and hold circuit 216. In those cases where a definite negative valley is provided by the fastener, negative peak and hold circuitry 222 will detect this value. Regardless of the virgin input torque signal, the artificially generated control signal serves to energize the negative peak and hold circuitry 222. Consequently, the user can rely upon the reading of the negative peak and hold circuitry 222 regardless of the fastener retorque signal characteristics.

The setting of latch 250 serves to light lamp 252 and activate an alarm 254 to signal to the user to cease supplying any further torque to the fastener. Additionally, the setting of latch 250 serves to reverse the conducting states of switches 242 and 244 thereby deenergizing the negative peak and hold circuitry 222. The setting of latch 250 also places semiconductor switch 256 into a conducting state such that the second positive peak and hold circuit 258 may detect and store the maximum amount of torque ultimately applied to the fastener by the operator. A multiposition switch 260 coupled to a meter display 262 through suitable buffer and scaling circuitry 264 provides the user with the ability to read out the contents of the various peak and hold circuits or the virgin torque signal.

After reading the disclosure set forth in the specification one skilled in the art may recognize other forms of practicing the substance of the invention disclosed therein. For example, it is envisioned that many of the discrete components could be reduced to integrated circuit form and that a microprocessor implementation is feasible. Therefore, while this invention has been described in connection with specific examples thereof, other modifications will become apparent upon the study of the specification, drawings and claims.

I claim:

1. Apparatus for measuring the amount of previously applied torque to a fastener comprising:
    transducer means providing an output signal representative of the amount of subsequently applied torque to the fastener, such torque being applied until motion of the fastener is obtained,
    detector means for detecting a change of slope in said transducer signal above a given threshold level, operative to provide an output related to the applied torque when the change of slope is detected; and
    display means for displaying the output of said detector means, said output being closely associated with the amount of torque originally applied to the fastener.

2. Apparatus for measuring the amount of previously applied torque to a fastener comprising:
    transducer means for providing an output signal representative of the amount of subsequently applied torque to the fastener, such torque being applied until motion of the fastener is obtained;
    storage means for storing an extreme value of a segment of the output signal from the transducer;
    switch means between said transducer and said storage means;
    means for energizing said switch means upon a first change of slope in said transducer output signal thereby energizing said storage means;
    means for deenergizing said switch means upon detection of a subsequent value change of said transducer signal thereby deenergizing said storage means for the remaining output of said transducer signal; and
    display means for displaying the value stored in said storage means, said value being closely associated with the amount of torque originally applied to the fastener.

3. Apparatus for measuring the amount of previously applied torque to a fastener comprising:
    transducer means providing an output signal representative of the amount of subsequently applied torque to the fastener, such torque being applied until motion of the fastener is obtained;
    first positive peak detector means for sensing the maximum value of said transducer signal for a given segment thereof;
    negative peak detector means for sensing the minimum value of the transducer signal for a segment thereof;
    generator means for generating a negatively sloped signal for energizing said negative peak detector and deenergizing said positive peak detector when there is a change of slope of said transducer signal above a given threshold level; and
    display means for displaying the value of at least said negative peak detector, said value being closely associated with the amount of torque originally applied to the fastener.

4. The apparatus of claim 3 wherein said generator means comprises a negative ramp generator whose output is summed with the transducer signal.

5. The apparatus of claim 3 which further comprises means for deenergizing said negative peak detector when the transducer signal becomes more positive than the value in said negative peak detector.